INVENTOR
SAMUEL B. KUNEY
BY
ATTORNEY

Jan. 12, 1971 S. B. KUNEY 3,553,981
APPARATUS FOR THE SPOT SHAPING OF KNIT FABRIC AND
RESULTANT FABRICS PRODUCED THEREBY
Original Filed Feb. 17, 1965 8 Sheets-Sheet 2

INVENTOR
SAMUEL B. KUNEY
BY
ATTORNEY

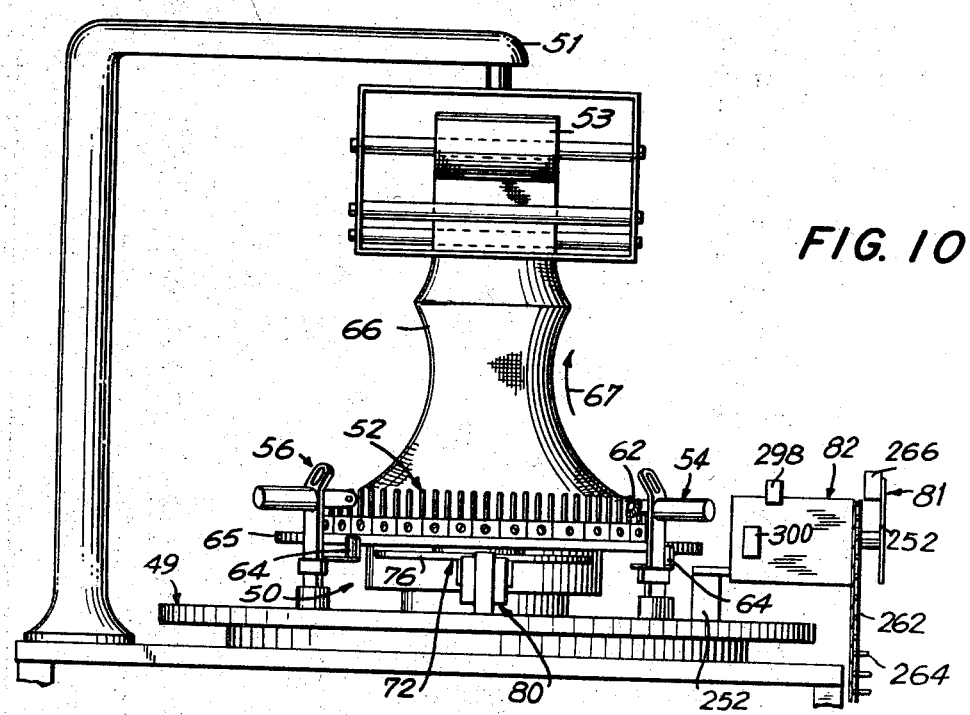
FIG. 10
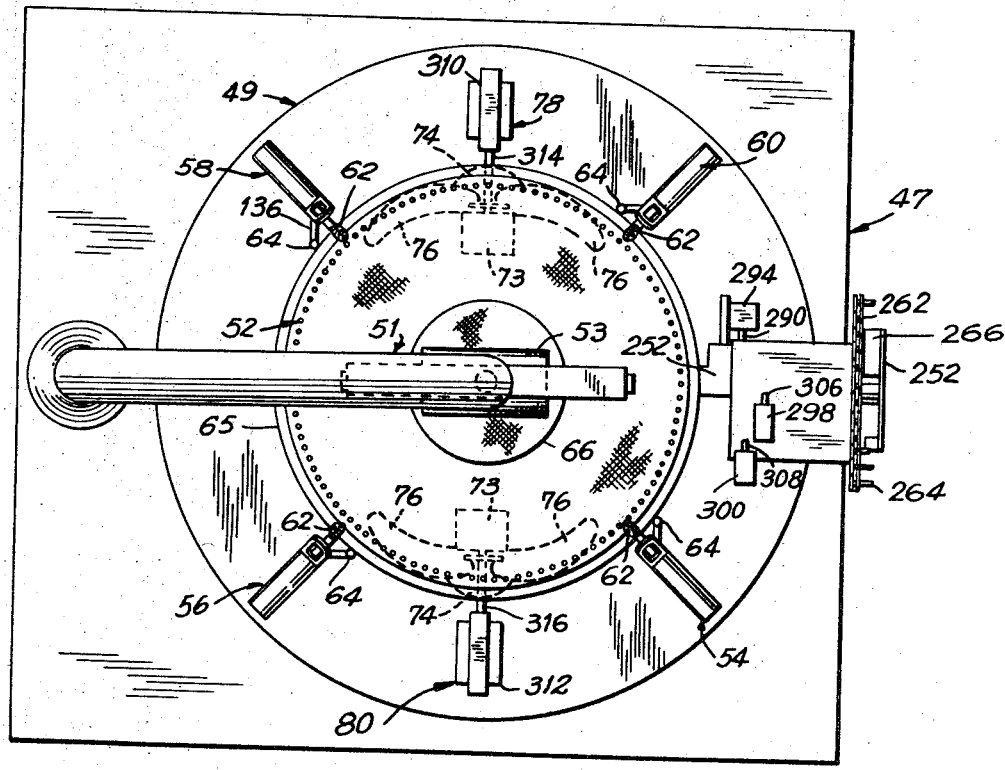
FIG. 11
INVENTOR
SAMUEL B. KUNEY
BY 
ATTORNEY

INVENTOR
SAMUEL B. KUNEY
BY
ATTORNEY

INVENTOR
SAMUEL B. KUNEY
BY
ATTORNEY

INVENTOR
SAMUEL B. KUNEY
BY
ATTORNEY

FIG. 20
FIG. 21
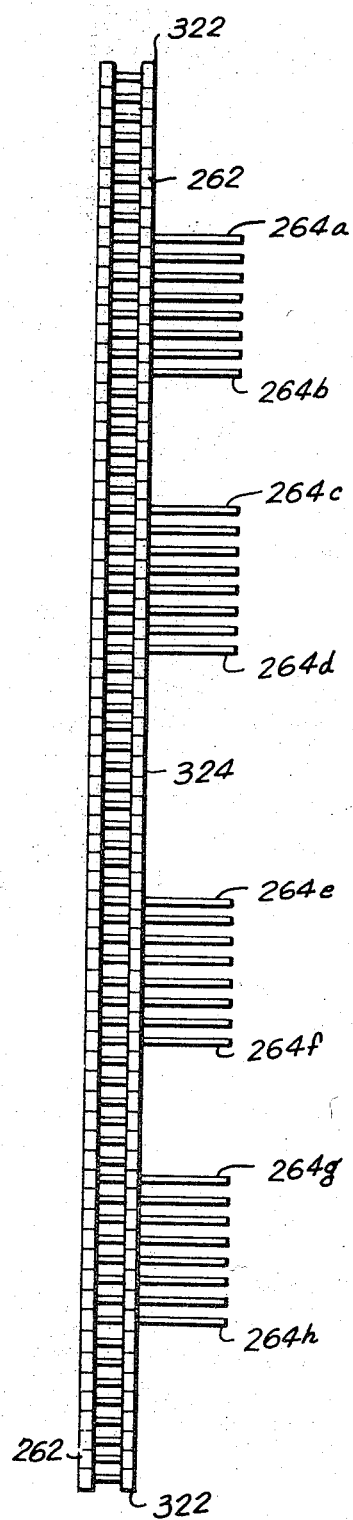
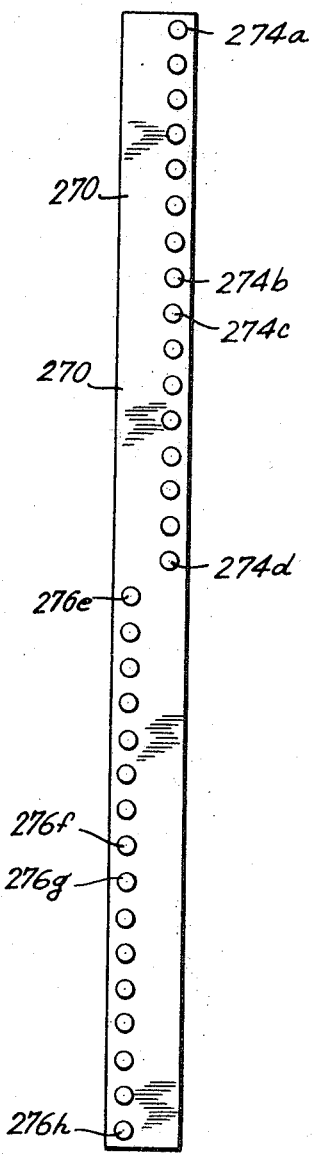
INVENTOR.
SAMUEL B. KUNEY
BY
ATTORNEY

United States Patent Office 3,553,981
Patented Jan. 12, 1971

3,553,981
APPARATUS FOR THE SPOT SHAPING OF KNIT FABRIC AND RESULTANT FABRICS PRODUCED THEREBY
Samuel B. Kuney, Dover, N.J., assignor to Swiss Knitting Company, Dover, N.J., a corporation of New Jersey
Original application Feb. 19, 1965, Ser. No. 433,853, now Patent No. 3,413,824, dated Dec. 3, 1968. Divided and this application May 17, 1968, Ser. No. 758,168
Int. Cl. D04b 13/00
U.S. Cl. 66—79        3 Claims

ABSTRACT OF THE DISCLOSURE

A circular spring united needle knitting machine with sinker burrs movable radially of the needle circle. Cam assemblies mounted beneath the needle circle and rotatable therewith project beyond a portion of the needle circle variable distances to position the sinker burrs through cam followers. A pattern control and associated solenoid actuated plungers, mounted exterior of the needle circle, selectively vary the distances which the cam assemblies project beyond the needle circle. The machine knits stretch fabric with convex and concave pockets at selected locations. Each pocket is of varying coursewise width along its walewise length.

---

This application is a division of U.S. application Ser. No. 433,853, filed Feb. 19, 1965, now Pat. No. 3,413,824.

This invention relates to the spot shaping of knit fabrics during the manufacture thereof, and to the spot shaped knit fabrics manufactured in accordance with the teachings of the invention.

An object of my invention is the provision of a method for the formation of integral pockets or "spots" of predetermined configuration and size, at predetermined location in a knit fabric during the manufacture thereof, and a method for the formation of integral seam pieces of predetermined configuration and size, at predetermined locations in a knit fabric during the manufacture thereof.

Another object of my invention is the provision of a method as above which makes possible the spot shaping of knit fabrics during the manufacture thereof without requiring the addition of courses in the construction of the said knit fabrics.

Another object of my invention is the provision of a method as above which is particularly adaptable to the practice thereof through the use of relatively inexpensive, somewhat modified, circular spring or latch needle knitting machines, to thus eliminate the need for the use of the significantly more expensive knitting machines of the full fashioning type for the spot shaping of knit fabrics during the manufacture thereof.

Another object of my invention is the provision of apparatus which are particularly adapted to the practice of the above method, and which are significantly less expensive and complex than the apparatus previously required for the spot shaping of knit fabrics during the manufacture thereof.

Another object of my invention is the provision of apparatus as above which include readily accessible and conveniently adjustable means for controlling the configurations, sizes and locations of the said pockets and seam pieces, whereby the said configurations, sizes and locations may be readily and conveniently adjusted.

Another object of my invention is the provision of apparatus as above which are substantially automatic in operation and thus require little or no attention during the operation thereof with resultant significant reduction in apparatus operating costs.

Another object of my invention is the provision of knit fabrics which include integral pockets or "spots" of predetermined configuration and size, formed at predetermined locations therein.

Another object of my invention is the provision of knit fabrics as above which further include integral seam pieces of predetermined configuration and size, formed at predetermined locations therein, as for example between two of the said pockets.

Another object of my invention is the provision of spot shaped knit fabrics as above of significantly reduced cost of manufacture.

Another object of my invention is the provision of method and apparatus as above which are particularly adapted to the manufacture of knit, stretch fabrics for use in the manufacture of articles of clothing.

Another object of my invention is the provision of spot shaped, knit, stretch fabrics, which are manufactured in accordance with the teachings of my invention and are particularly adapted for use in the manufacture of articles of clothing.

A further object of my invention is the provision of articles of clothing, as for example girdles or brassieres, of knit, stretch fabric construction which include integral, form fitting pockets of predetermined configuration and size, formed at predetermined locations therein for accentuating the portions of the body of the wearer, as for example the buttock cheeks or breasts, with which the said pockets come in contact, and which further include a seam piece of predetermined configuration and extent, formed between the said pockets to further accentuate the said body portions.

In a hereindisclosed preferred embodiment, my invention is directed to the manufacture of girdles of knit, stretch fabric construction, and is practiced on a somewhat modified, circular spring needle knitting machine. The four course pattern of the fabric construction is constituted by alternating courses of textile yarn, and courses of combined textile and stretch yarn. Readily variable, automatically operated control means are provided on the knitting machine to control the length of the textile yarn stitch at any point in the manufacture of a girdle body, whereby the lengthening of the textile stitch from the normal length thereof by the control means at predetermined times results in the formation of integral pockets or "spots" of predetermined configuration and size being formed at predetermined locations in the girdle body, and the shortening of the textile stitch from the normal length thereof by the control means at predetermined times results in the formation of integral seam pieces of predetermined configuration and size, at predetermined locations in the body of the girdle.

The above and other significant objects and advantages of my invention are believed made clear by the following detailed description thereof taken in conjunction with the accompanying drawings, wherein:

FIG. 10 is a somewhat diagrammatic side view of a circular spring needle knitting machine modified in accordance with the teachings of my invention;

FIG. 11 is a somewhat diagrammatic top view of the knitting machine of FIG. 10;

FIG. 20 is a developed view of the pattern chain of my invention; and

FIG. 21 is a developed view of the surface of the cam control cylinder of my invention.

Figure 1:
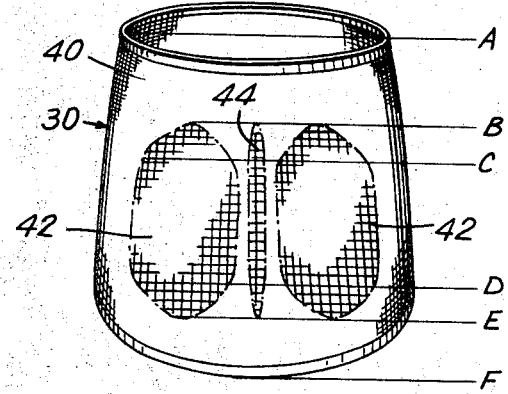
FIG. 1 is a perspective view of a legless girdle constructed in accordance with the teaching of my invention.
Figure 2:
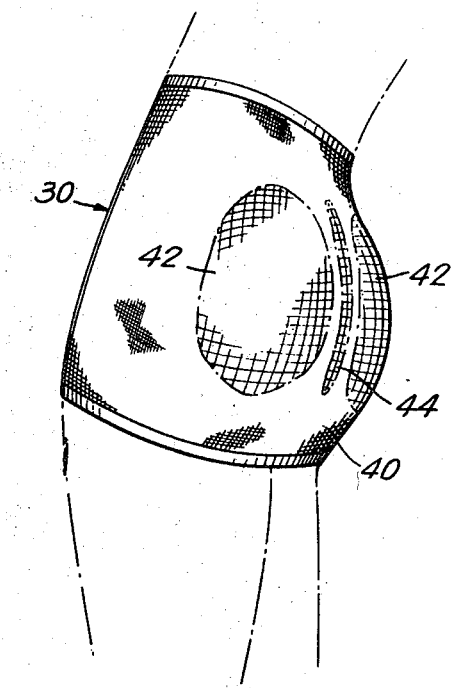
FIG. 2 is a perspective view of the girdle of FIG. 1, taken from a different angle, and includes the phantom depiction of a portion of the body of the girdle wearer.
Figure 7:
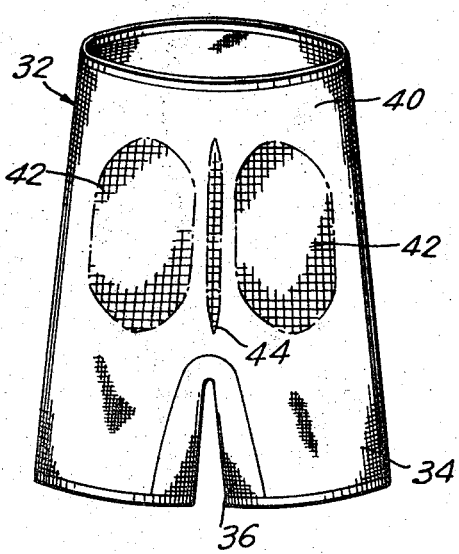
FIG. 7 is a perspective view of a panty girdle constructed in accordance with the teachings of my invention.
Figure 8:
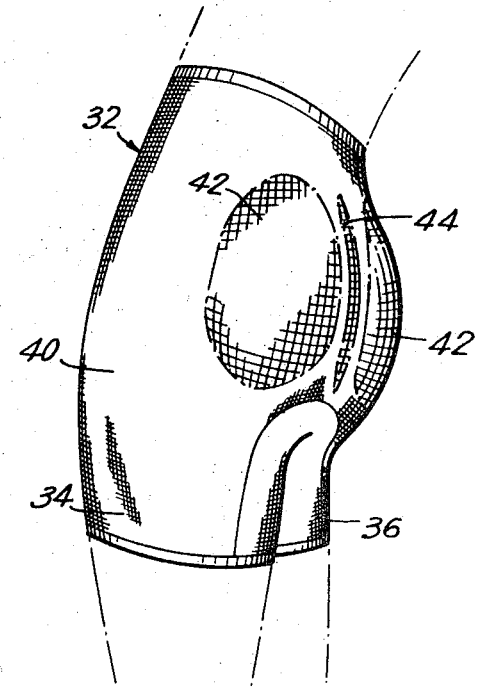
FIG. 8 is a perspective view of the girdle of FIG. 7, taken from a different angle, and includes the phantom depiction of a portion of the body of the girdle wearer.

Referring now to the drawings, a legless girdle constructed in accordance with the teachings of my invention is generally indicated at 30 in FIGS. 1 and 2, respectively, and a panty girdle constructed in accordance with the teachings of my invention is generally indicated at 32 in FIGS. 7 and 8, respectively. The panty girdle 32 includes integral leg portions 34 extending therefrom and separated by a crotch piece 36 positioned therebetween, as for example by being stitched thereto. It is to be understood that the said girdles 30 and 32, respectively, are intended as illustrative, only, of two of the wide variety of articles of clothing, as for example, girdles of all types, brassieres of all types, corsets of all types, sweaters and polo shirts of all types, and men's and women's bathing suits of all types, which may be advantageously constructed in accordance with the teachings of my invention.

Each of the said girdles 30 and 32 includes generally tubular body portions 40 of generally conventional, stretch fabric construction, shaped as shown in conventional manner, with relatively loosely knit, form-fitting pockets, or "spots" 42 of specialized, stretch fabric construction, and a relatively tightly knit seam piece 44, integrally formed at a predetermined location therein in accordance with the teachings of my invention in the manner described in detail hereinbelow.

Figure 3:
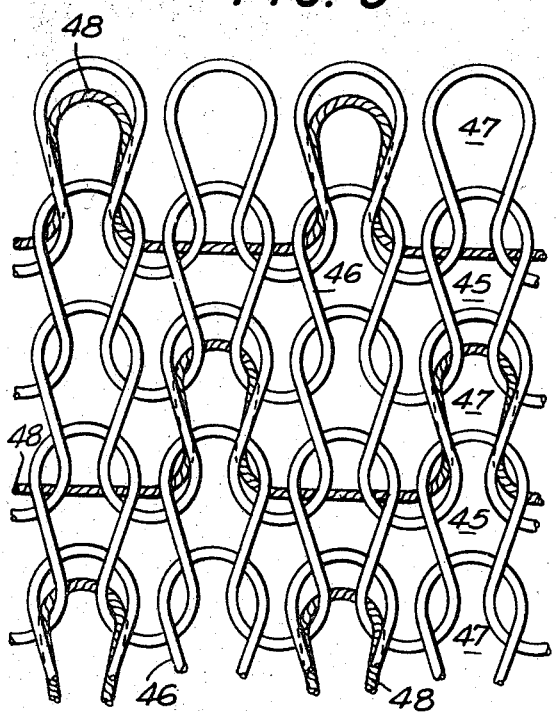
FIGS. 3 and 4 represent, on a greatly enlarged scale, the fabric constructions of different portions of the girdles of FIGS. 1 and 2.
Figure 4:
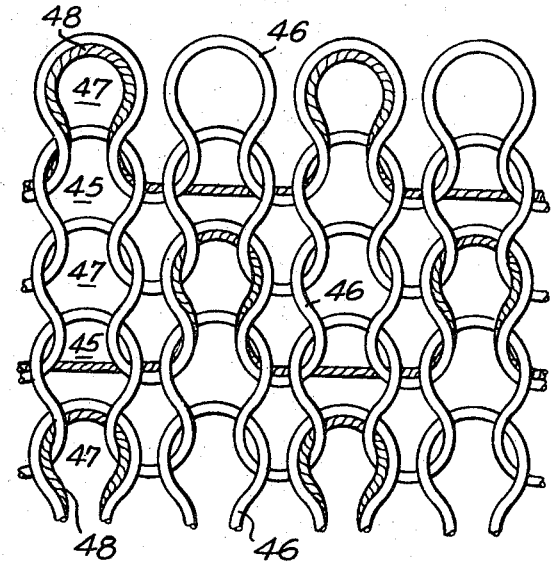

For purposes of comparison, the four courses necessary to make up a pattern of the respective fabric constructions utilized in the formation of the form-fitting pockets 42, and the body portions 40, are illustrated, on a greatly enlarged scale, in FIGS. 3 and 4, respectively. The said fabric constructions are very similar, with each comprising a plurality of alternating courses 45 of any suitable, generally non-stretchable textile yarn 46, interknit as shown with alternating courses 47 of combined textile yarn 46 and any suitable stretch yarn 48, as for example spandex. Since the textile yarn 46 is generally non-stretchable, the maximum extent to which the respective fabrics of FIGS. 3 and 4 can stretch to conform to the respective body portions of the wearer contacted thereby, is determined by the respective lengths of the stitches of the textile yarn 46 utilized in each of the textile yarn courses 45, and utilized in the combined textile and stretch yarn courses 47. The stitches of stretch yarn 48 utilized in the said combined courses 47 function to maintain the fabric in close contact with the body portion of the wearer contacted thereby.

The fabric construction of FIG. 3 differs from the fabric construction of FIG. 4 in that the length of the stitches of textile yarn 46 utilized in each of the textile yarn courses 45, and utilized in the combined textile and stretch yarn courses 47, of the former construction, is significantly greater than the corresponding textile yarn stitch lengths utilized in the latter construction. The respective stitch lengths of the stretch yarn 48 utilized in the textile yarn courses 45, and utilized in the combined textile and stretch yarn courses 47, do not differ substantially in the said constructions due, of course, to the inherent stretchability of the said stretch yarn. Thus it may be readily understood whereby the greater extent to which the fabric construction of FIG. 3 can stretch, as compared the extent to which the fabric construction of FIG. 4 can stretch, will result in the exertion of substantially less of a flattening effect on the shape of the body portions of the wearer with which the former fabric construction is in contact, and will thus provide for greater accentuation of the said body portions while, at the same time, providing a firm and shaping support therefor in the nature of a built-in cup. Thus it may also be readily understood whereby my invention provides for the addition of integral, form-fitting pockets or "spots" at predetermined locations in a knit fabric construction without requiring the addition of courses to the said fabric construction.

The fabric construction of the seam pieces 44 is not illustrated, but may be understood to be similar to the fabric constructions of FIGS. 3 and 4 with the exception that the lengths of the stitches of textile yarn 46 utilized in each textile yarn course, and combined textile and stretch yarn course, in the said seam piece fabric construction are significantly less than the lengths of the stitches of textile yarn 46 utilized in the corresponding courses in the body portion fabric construction of FIG. 4, whereby is provided a relatively tightly knit seam piece of significantly lessened stretchability.

The advantageous results provided by girdles constructed in accordance with the teachings of my invention are believed clearly illustrated by each of FIGS. 2 and 8, respectively, which make clear the manner in which the firm support and shapely accentuation of the buttock cheeks of the girdle wearers are accomplished by the contact of the integral, form-fitting pockets 42 therewith, and the delineation provided therefor by the tightly knit seam pieces 44, while the remaining portions of the bodies of the girdle wearers which are contacted by the girdles, are shapefully flattened in conventional stretch-fabric girdle manner by the contact of the less-stretchable, girdle body portions 40 therewith.

Articles of clothing constructed in accordance with the teachings of my invention may be conveniently and satisfactorily knit on somewhat modified, circular spring needle knitting machines. Thus my invention may be understood to make possible selective spot shaping in the manufacture of knit garments without requiring the use of the substantially more expensive, and complex, knitting machines of the full fashioning type. The construction and manner of operation of conventional, circular spring needle knitting machines, as for example those manufactured by the Tompkins Company of Syracuse, N.Y., are well known in this art and are described in detail, for example, in U.S. Pat. No. 2,081,816. Accordingly, the said construction and manner of operation are not described in detail herein except where necessary to a full, clear, concise and exact description of the modifications of such machines essential to the practice of my invention therewith.

A circular spring needle knitting machine modified in accordance with the teachings of a preferred embodiment of my invention is somewhat diagrammatically illustrated as indicated generally at 47 in FIGS. 10 and 11, and comprises a stationary base portion, generally indicated at 49, upon which is mounted a rotatable cylinder assembly generally indicated at 50. A circular array of spring needles, generally indicated at 52, is positioned as shown atop the cylinder assembly 50 and extends upwardly therefrom. Four moveable, sinker burr assemblies are generally indicated at 54, 56, 58 and 60, respectively, and are positioned as shown at approximately 90° intervals on the stationary base portion 49 adjacent the rotatable cylinder assembly 50. Each of the said sinker burr assemblies includes a rotatable sinker burr 62 which is in contact with, and moveable radially of, the array of needles 52, and a cam follower roller 64 which rides on the periphery of a rotatable cylinder assembly plate 65 and controls the position of the respective sinker burrs 62 relative to the array of needles 52 in a manner described in detail herein below.

It is to be understood that the respective sinker burr assemblies 54, 56, 58 and 60, each function, in cooperation with a non-illustrated, conventional textile yarn feed assembly, to knit one stitch of textile yarn 46 per complete revolution of the cylinder assembly 50, into the tube of fabric 66 being knit by the operation of the knitting machine 47. In addition, two non-illustrated, conventional sinker burr assemblies each function, in cooperation with a non-illustrated, conventional stretch yarn feed assembly and furnishing wheel, to combine one stitch of stretch yarn 48 with alternate stitches of the textile yarn 46 per complete revolution of the cylinder assembly 50, into the tube of fabric 66 being knit by the operation of the knitting machine 47. The respective lengths of the said stretch yarn stitches are controlled in conventional manner, to determine the shape of the girdle body portions 40. Thus, four courses of yarn in all, i.e., two courses 45 of textile yarn, and two courses 47 of combined textile and stretch yarn which alternate with the former courses in the manner made clear by FIGS. 3 and 4, are knit into the tube of fabric 66 for each revolution of the cylinder assembly 50.

A conventional, fabric take-up assembly is generally indicated at 51. The said fabric take-up assembly includes a take-up roll 53 and is supported as shown from the stationary base portion 49, and functions to take-up the tube of fabric 66 as the latter is knit by the operation of the machine 47 and moves upwardly in the manner indicated by the arrow 67 in FIG. 10.

The length of each stitch of the textile yarn 46 in each of the textile yarn courses 45, and the combined textile and stretch yarn courses 47, is determined at each point on the circumference of the said tube of fabric 66 by the positions of the respective blades 68 of the rotatable sinker burrs 62 relative to the particular needles of the circular array of needles 52 between which the said blades project, as the said tube 66 is rotated past the said burrs.

Figure 5:
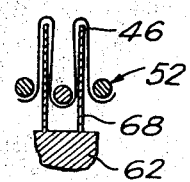
FIGS. 5 and 6 depict the moveable sinker burrs of my invention in different positions relative to the needles of a knitting machine.
Figure 6:
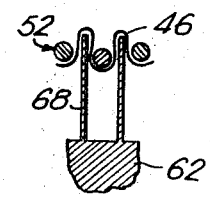

This is believed clearly illustrated by FIGS. 5 and 6, respectively, with the latter figure depicting two of the blades 68 of a sinker burr 62 in what may be termed a normal position thereof relative to the needles 52, and the former figure depicting two of the blades 68 of a sinker burr 62 in what may be termed an extended position thereof relative to the needles 52. With the sinker burr blades 68 in the said normal position thereof, a textile yarn stitch length of the nature shown in the courses 45 and 47 of FIG. 4 is knit in the particular area of the tube of fabric 66 then in contact with and being rotated past the blades 68 of the sinker burr 62. Conversely, with the sinker burr blades 68 in the said extended position thereof as seen in FIG. 5, a textile yarn stitch length of the nature shown in the courses 45 and 47 of FIG. 3 is knit in the particular area of the tube of fabric 66 then in contact with and being rotated past the blades 68 of the sinker burr 62. Also, with the sinker burr blades 68 in any one of the non-illustrated plurality of positions thereof relative to the needles 52 between the normal burr blade position of FIG. 6 and the extended burr blade position of FIG. 5, a textile yarn stitch length in the courses 45 and 47 greater than that shown in FIG. 4, but less than that shown in FIG. 3, will be knit in the particular area of the tube of fabric 66 then in contact with and being rotated past the blades 68 of the sinker burr 62.

In addition, with the sinker burr blades 68 of the sinker burr 62 in any one of the non-illustrated retracted positions thereof relative to the needles 52, i.e. the positions of the said blades wherein the same project to a lesser degree between the said needles than as shown in FIG. 6, a textile yarn stitch length in the courses 45 and 47 even less than that shown in FIG. 4 will be knit in the particular area of the tube of fabric 66 then in contact with and being rotated past the blades 68 of the burr 62, to in turn result in the formation of the tightly knit seam piece 44 in the body portion 40 of the girdle being constructed from the said tube of fabric. Thus, the selective movement of the respective sinker burrs 62 of the movable sinker burr assemblies 54, 56, 58, and 60 to and between the respective extended, normal, and retracted positions of the said sinker burrs at predetermined times during each revolution of the tube of fabric 66 and for a predetermined number of revolutions thereof, can be utilized to result in the formation of a plurality of the "spots" or pockets 42 of predetermined shape and extent, delineated by a seam piece 44 of predetermined shape and extent, at predetermined locations in the generally tubular body portion 40 of a girdle 30 being constructed from the said tube of fabric 66.

Two cylinder cam assemblies are indicated generally at 72 in FIG. 10. The said cam assemblies are carried from the lower surface of the cylinder assembly plate 65 and are rotatable therewith. The cylinder cam assemblies 72 each comprises a cam box 73, a buffing cam 74, and a plurality of shaping cams 76 positioned as shown to either side of the said buffing cam 74. The said buffing and shaping cams are intermittently movable between extended and retracted positions thereof relative to the periphery of the said cylinder assembly plate 65 and function, in cooperation with the cam follower rollers 64 of the moveable sinker burr assemblies 54, 56, 58 and 60, to control the positions of the respective sinker burrs 62 relative to the circular array of needles 52 in a manner described in detail hereinbelow.

Two solenoid operated, cam actuating assemblies are indicated generally at 78 and 80, respectively, and are positioned as shown atop the stationary base portion 49. The said cam actuating assemblies function to actuate the respective buffing and shaping cams 74 and 76 for the intermittent movement of the said cams between the extended and retracted positions thereof relative to the cylinder assembly plate 65 in a manner described in detail hereinbelow.

The operation of the solenoid operated, cam actuating assemblies 78 and 80 is in turn controlled by cam control means which are generally indicated at 81 and are incorporated in the conventional, circular spring needle knitting machine control assembly which is generally indicated at 82 and is positioned as shown atop the stationary base portion 49 adjacent the periphery of the cylinder assembly plate 65. The said cam control means function to selectively energize the solenoid operated, cam actuating assemblies 78 and 80, again in a manner described in detail hereinbelow.

In the herein disclosed preferred embodiment of my invention, the solenoid operated, cam actuating assembly 78 is controlled to operate only the respective buffing and shaping cams 74 and 76 of one cam assembly, 72, while the solenoid operated, cam actuating assembly 80 is controlled to operate only the respective buffing and shaping cams 74 and 76 of the other cylinder cam assembly 72.

Figure 12:
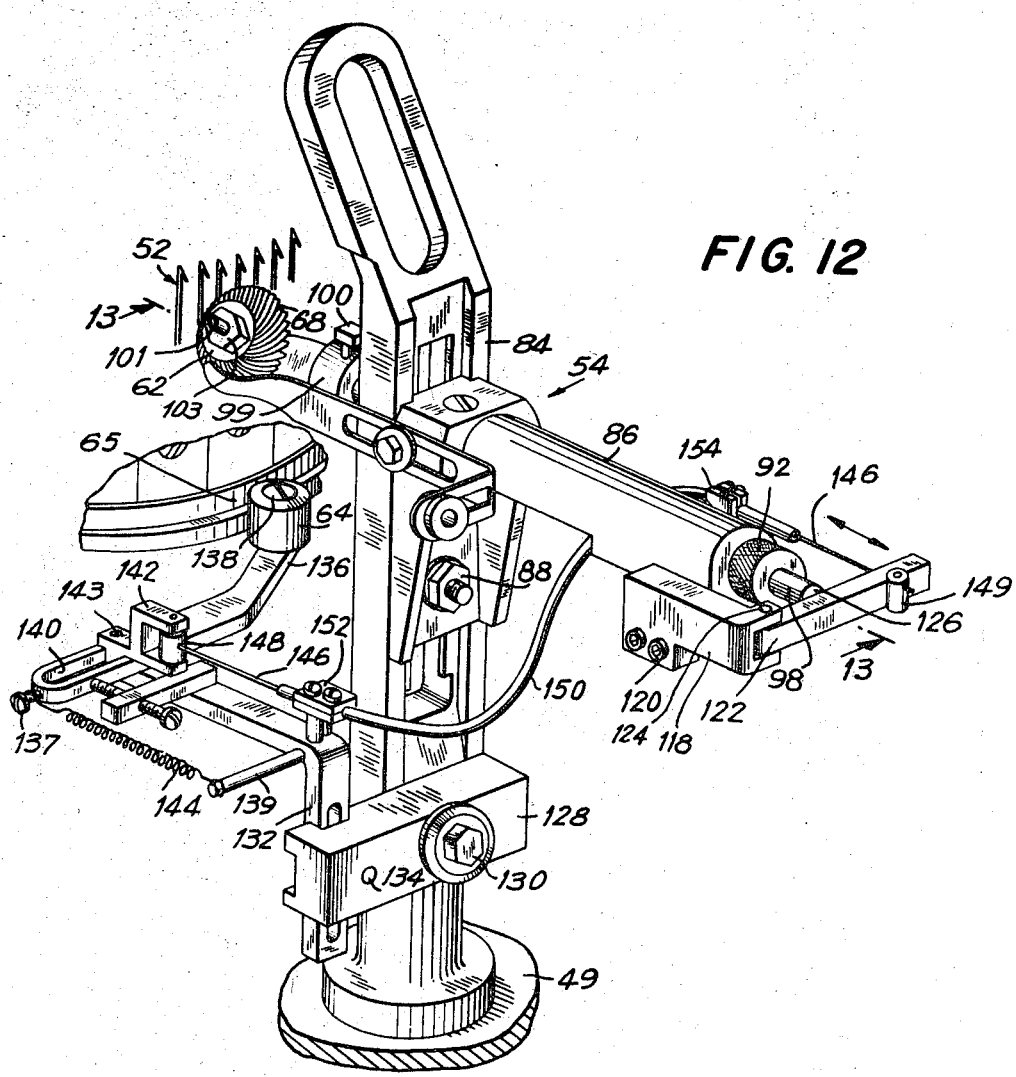
FIG. 12 is a perspective view of one of the movable sinker burr assemblies of my invention.
Figure 13:
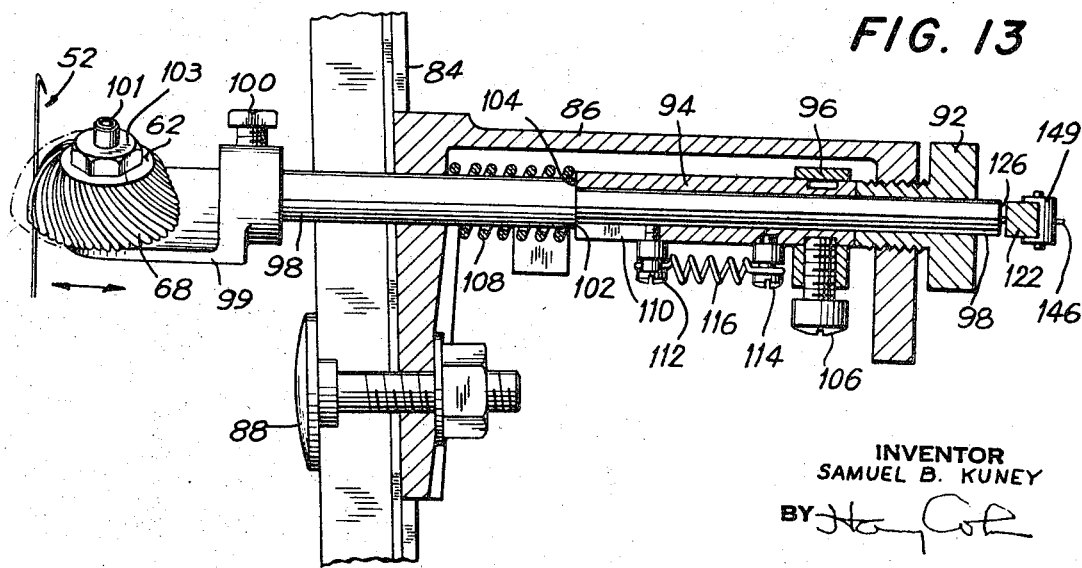
FIG. 13 is a cross sectional view taken along the line 13—13 in FIG. 12.

Referring now to FIGS. 12 and 13, one of the moveable sinker burr assemblies, as for example 54, will be described in detail. The said assembly comprises a stand 84, supported as shown from the stationary base portion 49, and upon which is adjustably positioned a sinker burr tube casting 86, with the vertical position of the latter being adjustable relative to the circular array of needles 52 through the use of a locking nut and bolt assembly 88. A stitch adjusting coupling 92 is screw threadably positioned as shown in a threaded bore in one extremity of the sinker tube casting 86 and extends into contact with a spindle tube 94. A stepped, sinker tube spindle 98 is slidably positioned in aligned bores in the sinker tube casting 86, the spindle tube 94, and the stitch adjusting coupling 92, respectively, and includes a sinker burr mounting member 99 affixed thereto at one extremity thereof by a set screw 100. The sinker burr 62 is rotatably supported from the sinker burr mounting member 99 by a sinker burr shaft 101 extending therebetween, and is maintained on the said shaft by an attachment nut 103 positioned thereover as shown.

The said spindle 98 includes a stepped portion as indicated at 102 in FIG. 13 which abuts the adjacent extremity 104 of the spindle tube 94 to thus limit the extent to which the said spindle can move to the right as seen in the said figure. The passage of the spindle 98 through the spindle tube 94 functions to support the latter within the sinker tube casting 86.

The spindle tube 94 passes through a bore in a spindle tube holding block 96 to support the latter in the depicted position thereof and an adjusting screw 106 projects as shown through the spindle tube holding block 96 into abutment with the spindle tube 94 for holding the angle of the sinker burr 62. A compression spring 108 is positioned around the spindle 98 between the sinker tube casting 86 and the spindle tube 94 to bias the latter toward the stitch adjusting coupling 92. A slot 110 is formed in the lower surface of the spindle tube 94, and a set screw 112 extends therethrough into a threaded bore in the spindle 98, while a set screw 114, which is spaced as shown from the set screw 112, extends into a threaded bore in the spindle tube 94. A tension spring 116 is connected as shown between the set screws 112 and 114, and functions to bias the spindle 98 to the right as seen in FIG. 13. Thus, the sinker burr 62 is biased to the retracted position thereof relative to the array of needles 52.

A support bracket 118 (FIG. 12) is affixed to the spindle tube holding block 96 by socket headed attachment screws 120 extending therebetween, and a swinging bar 122 is pivotally supported from the said support bracket 118 by a pivot pin 124 extending therebetween. The said swinging bar 122 is positioned relative to the adjacent extremity 126 of the spindle 98 so that pivotal movement of the said bar about the pivot pin 124, in the counter clockwise direction as seen in FIG. 12, will result in abutment between the said spindle extremity, and swinging bar, and movement of the former to the left as seen in FIG. 12. Thus may be understood the manner in which the sinker burr 62 may be moved from the retracted position thereof to the respective normal and extended positions thereof.

A draw bar support 128 (FIG. 12) is adjustably positioned on the stand 84 by means of a nut and bolt assembly 130, and a draw bar bracket 132 is adjustably supported from the draw bar support 128 by a screw 134 extending therebetween.

A draw bar 136 is pivotally supported from the remote end of the draw bar bracket 132 by a non-illustrated pivot pin extending therebetween, and includes the cam follower roller 64 rotably supported at one extremity thereof by a screw 138. A slot 140 is formed as shown in the draw bar 136 and a draw bar block 142 adjustably positioned therein by a screw 143. A spring attachment screw 137 extends from one extremity of the draw bar 136, and a spring attachment rod 139 extends from the draw bar bracket 132. A tension spring 144 extends between and is connected to the said spring attachment screw and rod and functions to bias the cam follower roller into firm contact with the rotating periphery of the cylinder assembly plate 65.

A center wire 146 of a bowden cable is pivotally affixed, at one extremity thereof, to the draw bar block 142 by means of a pivotal holding member 148 extending therebetween. The wire center of the cable extends as shown from the draw bar block 142 to and through a bore in swinging bar 122, and is pivotally attached as shown to the latter by a pivotal holding member 149. The casing 150 of the cable is supported from the draw bar bracket 132 by a tube holder 152, and from the sinker tube casting 86 by a tube holder 154. Thus transverse movement of the cam follower roller 64, as caused by the rotation of the respective surfaces of the shaping and buffing cams 76 and 74 therepast attendant the rotation of the cylinder assembly 65, will result in movement of the sinker burr 62 through and between the respective extended, normal and retracted positions thereof attendant the cooperation action of the draw bar 136, the draw bar block 142, the flexible wire 146, the swinging bar 122, and the spindle 98 upon which the said sinker burr is rotatably mounted.

The respective cylinder cam assemblies 72 (FIGS. 10 and 11), are substantially identical, and one of the said cam assemblies, is depicted in detail in FIGS. 14 through 17. Referring now to these figures, the said cam assembly comprises a cam box which is generally indicated at 73 in FIG. 17 and is secured to the cylinder assembly plate 65 in any suitable way as by two screws, not shown. The said cam box includes an upper cam box cover 160 and a lower cam box cover 162. The said upper and lower cam box covers are spaced by spacer members 164 and 166 (FIGS. 14 and 15) positioned therebetween, and are attached together by attachment screws 168 which extend through aligned, threaded bores in the said covers and spacer members, respectively.

Figure 14:
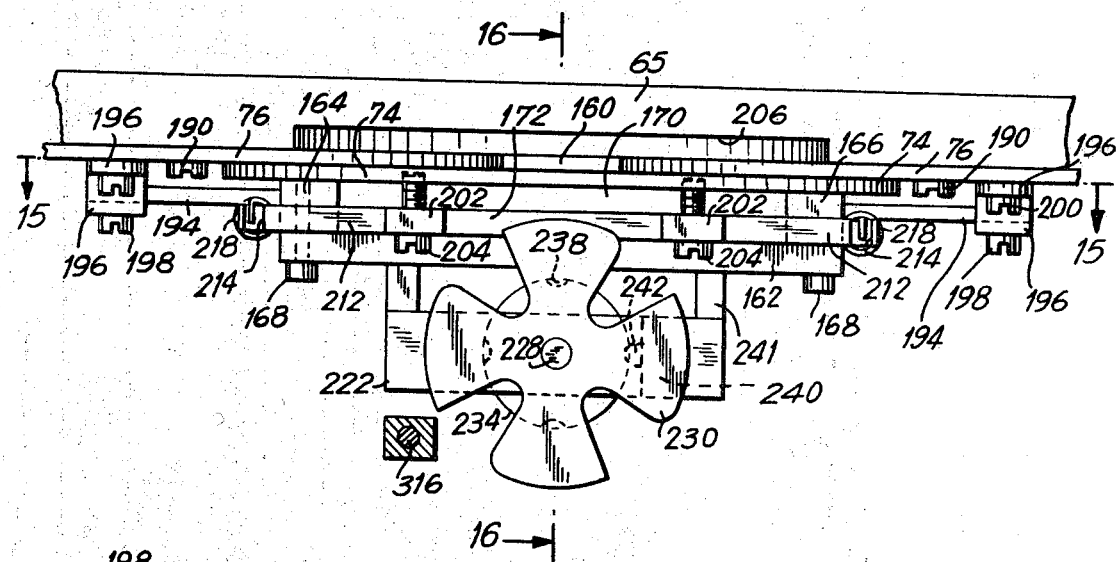
FIG. 14 is a front elevational view of one of the cylinder cam assemblies of my invention.
Figure 15:
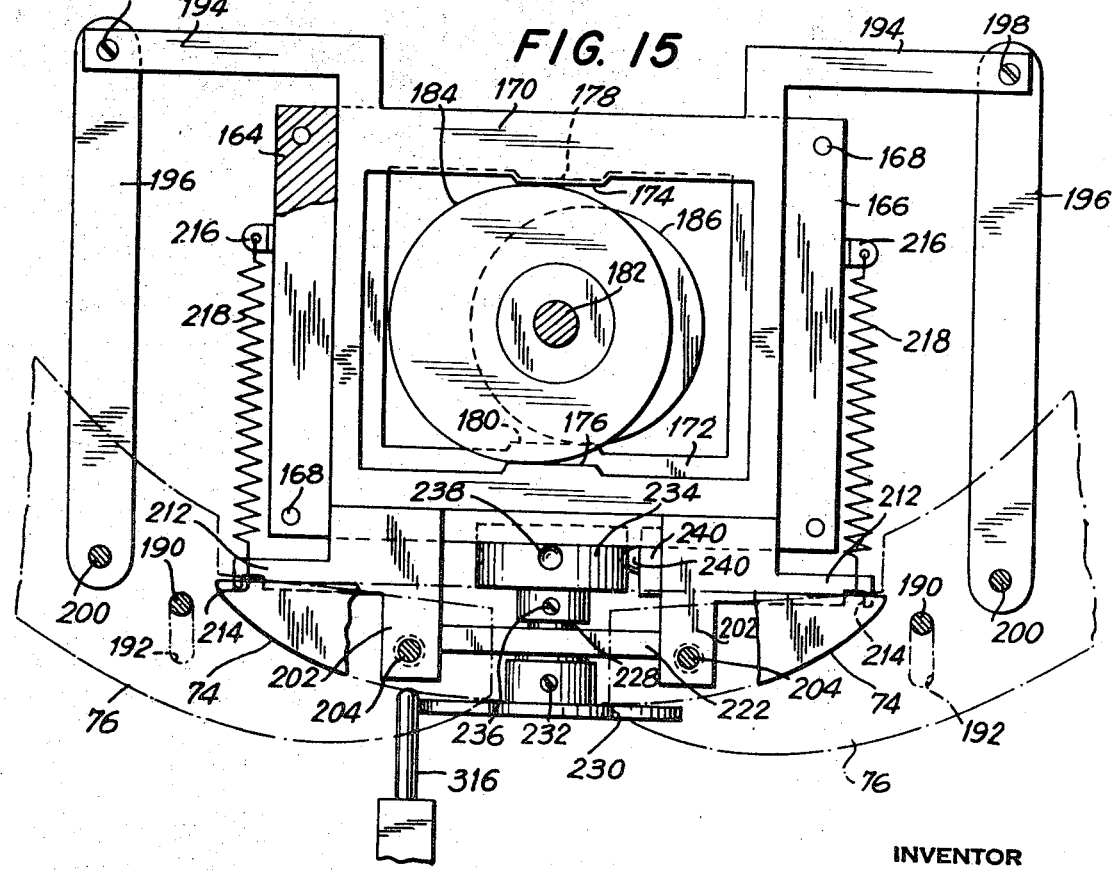
FIG. 15 is a cross sectional view taken along the line 15—15 in FIG. 14.

A shaping cam drive plate 170, and a buffing cam drive plate 172 are slidably positioned in surface contact as best seen in FIGS. 14 and 15 in the space between the said upper and lower cam box covers 160 and 162. Each of the said cam driving plates has the central portion thereof cut out as shown, with cam followers 174 and 176, respectively, extending into the cut out area of the shaping cam drive plate 170, and cam followers 178 and 180, respectively, extending into the cut out area of the buffing cam drive plate 172.

Figure 16:
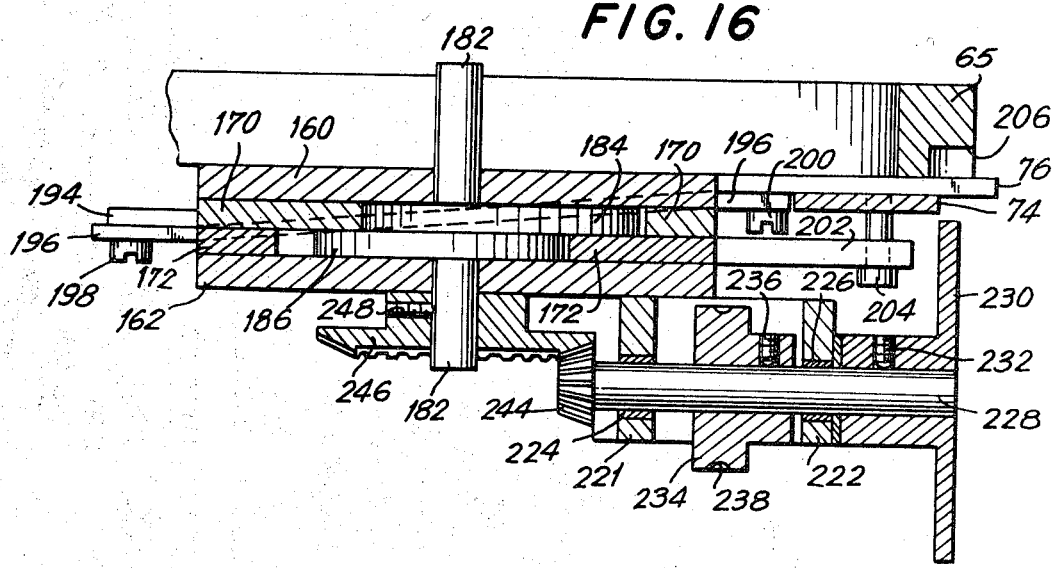
FIG. 16 is a cross sectional view taken along the line 16—16 in FIG. 14.

A rotatable cam shaft 182 extends as shown through and between aligned bores in the upper and lower cam box covers 160 and 162 and includes a shaping cam drive cam 184 and a buffing cam drive cam 186 fixedly attached thereto for rotation therewith in the space between the said upper and lower cam box covers. The shaping cam drive cam 184 is positioned in the cut out area of the shaping cam drive plate 170 and cooperates with the cam followers 174 and 176 formed thereon, whereby driven rotation of the said drive cam through a complete revolution thereof will result in reciprocatory horizontal movement of the said shaping cam drive plate 170 relative to the cylinder assembly plates as seen in FIG. 16. Similarly the buffing cam drive cam 186 is positioned in the cut out area of the buffing cam drive plate 172, and cooperates with the cam followers 178 and 180 formed thereon, whereby driven rotation of the said buffing cam drive cam through a complete revolution thereof will result in reciprocatory horizontal movement of the said buffing cam drive plate 172 as seen in FIG. 16.

Figure 17:
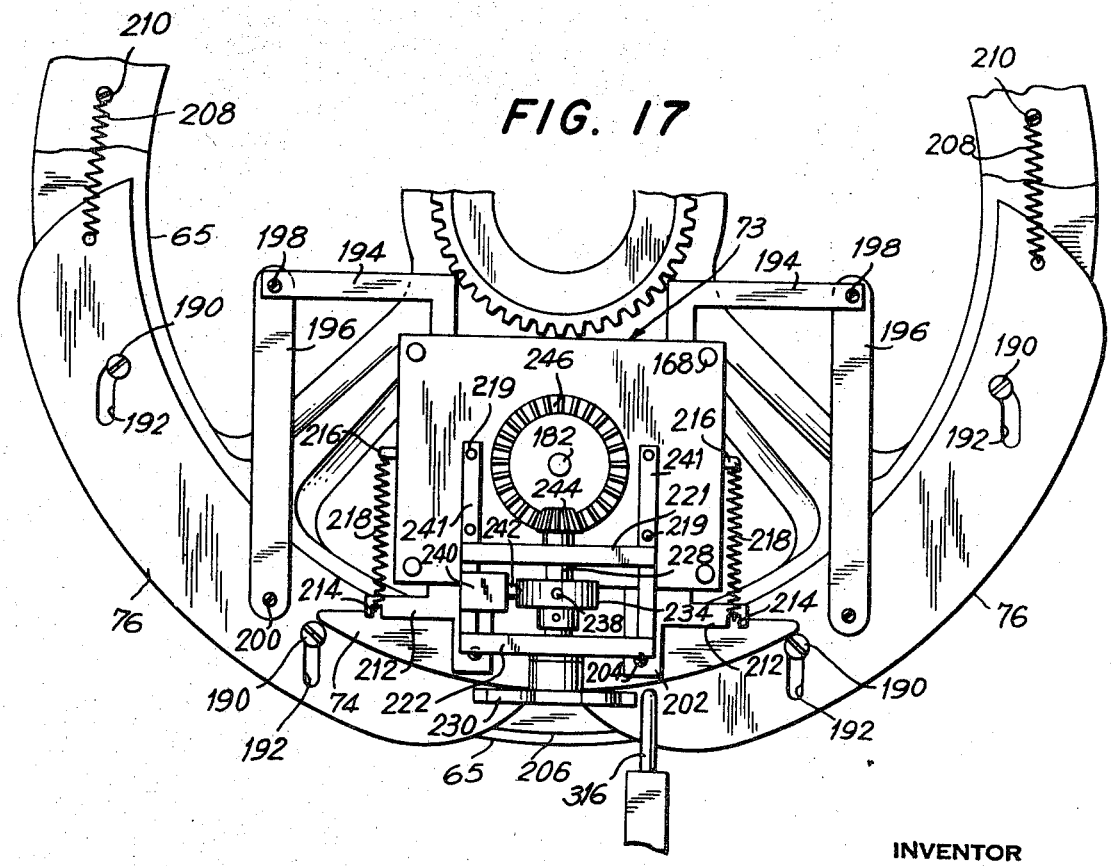
FIG. 17 is a bottom elevational view of one of the cylinder cam assemblies of my invention.

The shaping cams 76 are slidably supported and guided from the undersurface of the cylinder assembly plate 65 by support and guide screws 190 which project, through guide slots 192 formed in the said shaping cams, into threaded bores provided therefor in the said undersurface in the manner best seen in FIG. 17. Arm-like extensions 194 project as best seen in FIGS. 15 and 17 from the shaping cam drive plate 170, and shaping cam push arms 196 are pivotally connected, at corresponding extremities thereof, to the adjacent extremities of the said extensions by pivot pins 198 extending therebetween. The push arms 196 are also pivotally connected, adjacent the opposite extremities thereof, to the respective shaping cams 76 by pivot pins 200 extending therebetween.

Thus, it may be readily understood whereby intermittent, driven rotation of the shaping cam drive cam 184, as for example through one complete revolution thereof, will result in intermittent movement of the shaping cams 76 as for example from the retracted positions thereof, to the extended positions thereof and back to the retracted positions thereof relative to the periphery of the cylinder assembly plate 65. This is to say that the said shaping cams 76 will be reciprocated between the retracted positions thereof as seen in FIG. 11, i.e. the positions in which the respective peripheries of the shaping cams 76 do not extend radially outward beyond the periphery of the cylinder assembly plate 65 and thus do not contact the cam follower rollers 64 and move the draw bars 136 of the respective moveable sinker burr assemblies 54, 56, 58, and 60 (FIG. 11) upon rotation of the cylinder assembly plate 65, to the extended positions of the said shaping cams as seen from the bottom in FIG. 17, i.e. the positions thereof in which the respective peripheries of the shaping cams 76 do extend radially outward beyond the periphery of the cylinder assembly plate 65 and thus do contact the cam follower rollers 64 and move the draw bars 136 of the said respective moveable sinker burr assemblies upon rotation of the said cylinder assembly plate.

The buffing cam drive plate 172 includes extensions 202 which project therefrom in the manner best seen in FIGS. 15 and 17. The buffing cam 74 is slidably positioned as best seen in FIGS. 14, 15 and 16 in surface contact with the undersurface of the shaping cams 76, and is supported and guided in this position by two attachment screws 204 which extend through bores provided therefor in the said buffing cam drive plate extensions 202 into threaded bores in the said buffing cam. The periphery of the cylinder assembly plate 65 is undercut as indicated at 206, in the manner best seen in FIGS. 14 and 16, in the area of the said plate 65 immediately above the buffiing cam 74. This insures that the respective cam follower rollers 64 of each of the moveable sinker burr assemblies will, of necessity, come into contact with the periphery of the buffiing cam 74 every time the said undercut area of the cylinder assembly plate 65 is rotated past one of the said cam follower rollers. Thus, it may be readily understood whereby intermittent driven rotation of the buffing cam drive cam 186, as for example through one complete revolution thereof, will result in movement of the buffing cam 74, as for example from the extended position thereof to the retracted position thereof and back to the extended position thereof relative to the periphery of the undercut area of the cylinder assembly plate 65. This movement of the buffing cam 74 will, of course, occur simultaneously with the movement of the shaping cam 76 since the respective drive cams 184 and 186 are simultaneously driven from the cam shaft 182.

Since the cam follower rollers 64 of the respective moveable sinker burr assemblies always contact the periphery of the buffing cam 76 as the latter is rotated therepast, the shape of the periphery of the buffing cam 76 follows closely the shape of a corresponding accurate portion of the periphery of the cylinder assembly plate. This is to say that the shape of the periphery of the buffing cam is a circular arc whereby, when the buffing cam is moved to its extended position, the respective peripheries of the cylinder assembly plate and the buffing cam will present a smooth, cylindrical surface to the cam follower rollers 64 of the respective moveable sinker burr assemblies and will thus not change the positions of the respective sinker burrs 62 relative to the array of needles 52 as the cylinder assembly plate rotates during operation of the knitting machine.

Biasing springs 208 are provided to bias the shaping cams 76 to the retracted positions thereof and extend as shown in FIG. 17 between the said shaping cams to attachment screws 210 provided therefor on the under surface of the cylinder assembly plate 65. Projections 212 extend as best seen in FIG. 15 from the buffing cam drive plate 172 and include notches 214 formed adjacent the respective extremities thereof. Spring attachment members 216 extend from the sides of the respective spacer members 164 and 166, and biasing springs 218 are provided to extend as shown between the said notches and spring attachment members, respectively, to bias the buffing cam 74 to retracted position thereof.

In the hereindisclosed preferred embodiment of my invention, the respective buffing and shaping cams 74 and 76 are arranged so that the buffing cam 74 is in the extended position thereof when the shaping cam 76 is in the retracted position thereof, and vice versa. Thus, as the buffing cam 74 is intermittently moved toward the retracted position thereof, the shaping cams 76 are intermittently moved toward the extended positions thereof, and vice versa.

A support housing is attached to the lower cam box cover 162 by attachment screws 219 extending therebetween and extends downwardly from the said cam box cover as best seen in FIG. 16. Walls 221 and 222 are included in the said housing and comprise bearings 224 and 226 positioned in aligned bores formed therein. A drive shaft 228 extends as shown through the said bearings and includes a star wheel 230 affixed to the remote extremity thereof by a set screw 232 extending therebetween. A star wheel stop cylinder 234 is affixed to the drive shaft 228 intermediate the housing walls 221 and 222 by a set screw 236 extending therebetween, and includes a plurality of detents 238 formed in the periphery thereof. A star wheel stop member housing 240 (FIG. 17) is supported from wall 241 of the support housing 220, and includes a spring biased stop member 242 projecting therefrom into contact with the periphery of the star wheel stop cylinder 234. The said stop member 242 cooperates with the detents 238, which are formed at 90° intervals in the periphery of the stop cylinder 234, to stop and positively locate the said cylinder and drive shaft 228 after each quarter revolution thereof.

A bevel gear 244 is affixed to the other extremity of the drive shaft 228 by a non-illustrated set screw extending therebetween and is drivingly enmeshed with a bevel gear 246 which is affixed to the adjacent extremity of the cam drive shaft 182 by a set screw 248 extending therebetween. A preferable ratio between the respective bevel driving gears 244 and 246 is four to one whereby four complete revolutions, or sixteen quarter turns of the star wheel 230, and drive shaft 228 and bevel gear 244, will result in one complete revolution of the bevel gear 246, the cam drive shaft 182, the buffing cam drive cam 186, and the shaping cam drive cam 184. It is to be understood that one complete revolution of the said drive cams 186 and 184 results in turn in coordinated movement of the respective buffing and shaping cams 74 and 76 through one complete cycle of operation thereof, as for example from the extended position of the said buffing cam to the retracted position thereof and back to the extended position thereof, and from the retracted positions of the said shaping cams to the extended positions thereof and back to the retracted positions thereof.

Figure 18:
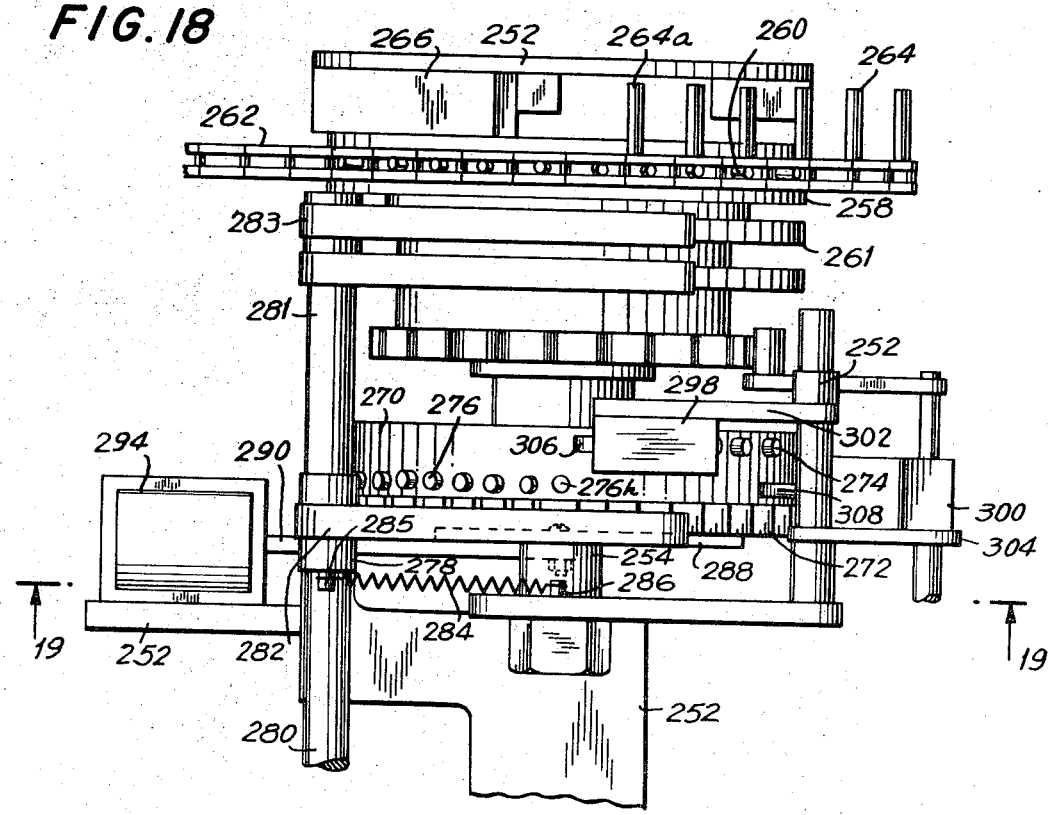
FIG. 18 is a top elevational view of the cam control assembly of my invention depicted in operative relationship with the control assembly of the knitting machine of FIGS. 10 and 11.
Figure 19:
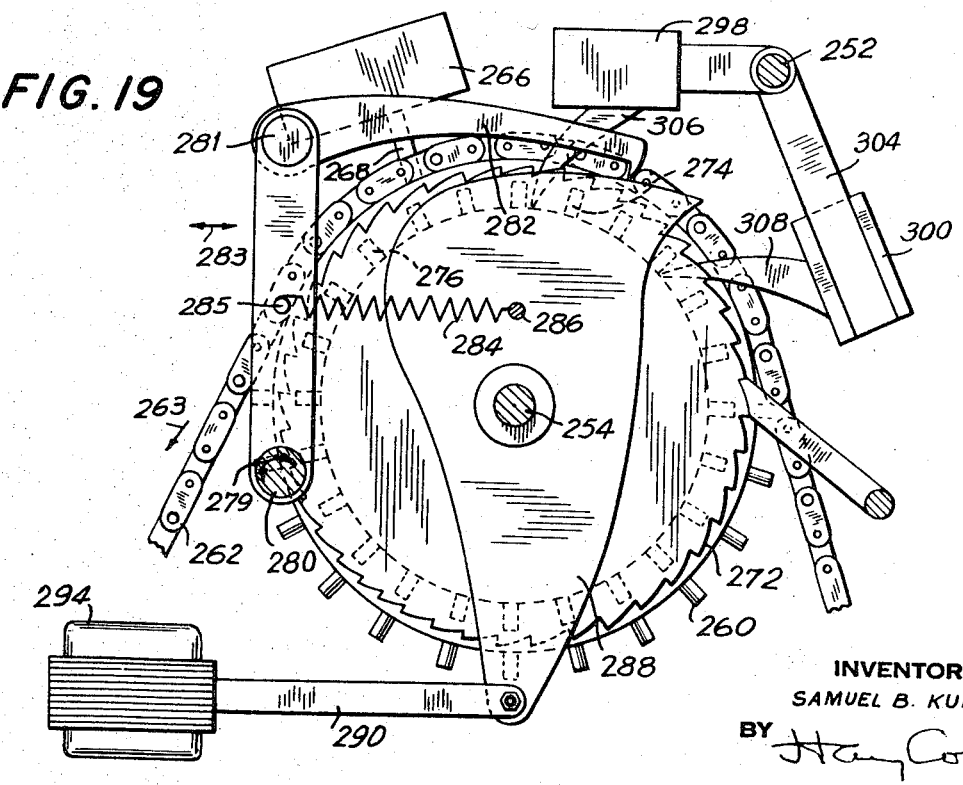
FIG. 19 is a cross sectional view taken along the line 19—19 in FIG. 18.

The cam control means 81 are depicted in detail in FIGS. 18 and 19 in conjunction with those elements of the generally conventional circular spring needle knitting machine control assembly 82, the detailed depiction and description of which are considered essential to a full, clear, concise and exact description of the said cam control means.

A control assembly support frame is indicated at 252 and is attached to the stationary base portion 49 in any convenient manner to extend upwardly therefrom. A support shaft 254 is non-rotatably positioned in aligned bores provided therefor in the said support frame 252 and a lock nut is threadably attached to a protruding extremity of the support shaft 254 to maintain the latter in position in the said support frame.

A chain drive wheel 258 is rotatably mounted on the support shaft 254 and includes chain drive pins 260 equally spaced on the periphery thereof and extending radially therefrom, and a racking gear 261 formed as shown at one side of the said chain drive wheel for purposes of driving the latter in a manner described in detail hereinbelow.

A pattern chain 262 extends as shown around a portion of the periphery of the chain drive wheel 258 with the links of the said chain cooperating with the said chain drive pins to enable the drive of the said chain through the control assembly upon rotation of the said chain drive wheel. The pattern chain 262 is driven through the control assembly by the arrow 263 in FIG. 19.

A plurality of spaced groups of spaced chain pins 264 are provided on the pattern chain 262 and extend therefrom in the spaced apart manner best seen in FIG. 18. In the herein disclosed preferred embodiment of my invention, four groups of eight each of the said chain pins are provided in the manner best seen in FIG. 20 for purposes described in detail hereinbelow.

A control switch 266 is positioned on the support frame 252 adjacent the chain drive wheel 258 and includes a switch actuator arm 268 which extends as shown into the path of the chain pins 264 as the latter move through the control assembly along with the pattern chain 262. The control switch 266 is arranged so that it will be momentarily switched to the "on" position thereof everytime a chain pin 264 passes therebelow and depresses the switch actuator arm 268.

A cam control cylinder 270 is rotatably mounted on the support shaft 254 and includes a racking gear 272 formed thereon, and staggered rows of spaced, cam control pins 274 and 276, respectively, projecting as shown radially outward from the periphery of the said cam control cylinder 270.

In the hereindisclosed preferred embodiment of my invention, there are two spaced groups of eight each of the said cam control pins 274, and two groups of eight each of the said cam control pins 276, staggered as shown in FIG. 21 for purposes described in detail hereinbelow.

A drive shaft 280 extends laterally of the control assembly and includes a draw arm 278 (FIG. 19) fixedly secured thereto adjacent one extremity thereof. A draw shaft 281 is fixedly secured to the remote extremity of the said draw bar as shown, and spaced pawls 282 and 283 are pivotally attached, at corresponding extremities thereof, to the said draw shaft. The opposite extremity of the pawl 282 cooperates with the racking gear 272 to intermittently rotate the cam control wheel 270, while the opposite extremity of the pawl 283 cooperates with the racking gear 261 to intermittently rotate the chain drive wheel 258 to drive the pattern chain 262 through the control assembly. To this effect, the drive shaft 280 is intermittently rotated back and forth through a complete cycle of operation, between predetermined angular positions thereof in the manner indicated by the arrow 279 in FIG. 19, by non-illustrated, conventional drive means, the operation of which is coordinated with the operation of the non-illustrated, conventional knitting machine drive means which function to rotate the cylinder assembly plate 65 and the fabric take-up roll assembly 53.

A biasing spring 284 extends as shown between a spring attachment member 285 on the central portion of the draw arm 278, and a spring attachment member 286 on the support frame 252 to bias the said draw arm to the position thereof depicted in FIG. 19.

A pawl shield 288 is rotatably mounted on the support shaft 254 adjacent the cam control cylinder 270 and includes an actuating arm 290 pivotally attached to the lower extremity thereof by a pivot pin extending therebetween. A solenoid 294 is positioned as shown on the support frame 252 with the armature thereof connected in any convenient manner to the shield actuating arm 290. The solenoid 294 is arranged so that the energization thereof will result, through the action of the shield actuating arm 290, in clockwise rotation of the shield 288 from what may be termed the "operative" position thereof as depicted in FIG. 19, i.e. the position of the said shield in which the upper edge thereof contacts the lower edge of the pawl 282 and prevents the latter from engaging the racking gear 272 and accordingly advancing the cam control cylinder one racking gear tooth for each cycle of operation of the drive shaft 280; to what may be termed the "inoperative" position of the shield 288, i.e. the non-illustrated position of the said shield in which the same is rotated sufficiently in the clockwise direction from the "operatve" position thereof seen in FIG. 19 so that the upper edge of the said shield no longer interferes with the engagement of the pawl 282 with the racking gear 272, whereby the cam control cylinder 270 is advanced one racking gear tooth for every cycle of operation of the drive shaft 280. Thus, it may be understood whereby the back and forth rotation of the drive shaft 280 through each complete cycle of operation thereof will result in the advancement of the chain drive wheel 258, through the cooperation between the pawl 283 and the racking gear 261, and will result in corresponding and simultaneous advancement of the cam control cylinder 270, through the cooperation between the pawl 282 and racking gear 272, only if the pawl shield 288 has been moved to the "inoperative" position thereof by the action of the solenoid 294 and actuating arm 290.

Control switches 298 and 300, respectively are positioned as shown on support brackets 302 and 304 which extend from the support frame 252 adjacent the periphery of the cam control cylinder 270. Control switch 298 includes an actuator arm 306 which extends into the path of travel of the spaced rows of spaced cam control pins 274 attendant the intermittent rotation of the cam control cylinder 270, while control switch 300 includes an actuator arm 308 which similarly extends into the corresponding path of travel of the spaced row of spaced cam control pins 276. Control switch 298 is arranged to be momentarily switched to the "on" position thereof every time the switch actuator arm 306 is depressed by the passage of a cam control pin 274 therepast, while control switch 300 is arranged to be momentarily switched to the "on" position thereof every time the switch actuator arm 308 is depressed by the passage of a cam control pin 276 therepast. It is to be understood that each of control switches 266, 298 and 300, respectively, is biased to the "off" position thereof whereby the said switches will immediately return to the "off" position thereof after a chain or cam control pin has passed out of contact with the respective actuator arms thereof.

The solenoid operated, cam actuating assemblies 78 and 80 (FIG. 11) comprise solenoids 310 and 312 which are positioned as shown atop the stationary base portion 49 adjacent the periphery of the rotatable cylinder assembly plate 65. A cam actuating plunger 314 is connected in any convenient manner to the armature of the solenoid 310 and extends therefrom toward the rotatable cylinder assembly plate 65, while a cam actuating plunger 316 is similarly connected to the armature of the solenoid 312 and extends therefrom in a corresponding manner. The said plungers may thus be understood to be reciprocable with the said solenoid armatures upon the energization and deenergization of the said solenoids, and are movable from retracted positions thereof attendant the deenergized conditions of the said solenoids, to extended positions thereof attendant the energized conditions of the said solenoids.

In the extended positions of the respective cam actuating plungers 314 and 316, the same are located as best seen in FIG. 15, directly in the paths of travel of the star wheels 230 of the respective cam assemblies 72 in such manner that the said star wheels will strike the said plungers and be rotated one quarter turn thereby as the former are rotated therepast attendant the rotation of the cylinder assembly plate 65 during the operation of the knitting machine. This quarter turn rotation of the star wheels 230 will in turn result in movement of the respective buffing and shaping cams 74 and 76 relative to the periphery of the said cylinder assembly plate in the manner described in detail hereinabove.

In the retracted positions of the respective cam actuating plungers 314 and 316, the same do not project into the paths of travel of the star wheels 230 whereby no rotation of the latter about the respective axes thereof will be effected as the said star wheels are rotated past the solenoid operated, cam actuating assemblies 78 and 80 during each rotation of the cylinder assembly plate 65. Thus, it may be understood whereby movement of the respective buffing and shaping cams 74 and 76 relative to the cylinder assembly plate 65 will occur only during the revolutions of the latter which coincide with the energization of at least one of the solenoid operated, cam actuating assemblies 78 and 80.

The control switch 266 (FIGS. 18 and 19) is electrically connected to the solenoid 294 (which controls the movement of the pawl shield 288) in such manner that the solenoid 294 is only energized when the control switch 266 has been momentarily switched to the "on" position thereof attendant the depression of the switch actuating arm 266 by a chain pin 264. Thus, it may be understood whereby the cam control cylinder 270 can only be advanced by the pawl 282 at such times when the control switch 266 has been switched to the "on" position thereof.

The control switch 298 (FIGS. 18 and 19) is electrically connected to the solenoid 310 (FIG. 11) of the solenoid operated, cam actuating assembly 78 in such manner that the said solenoid is only energized when the said switch is switched to the "on" position thereof by the depression of the switch actuating arm 308 by a cam control pin 274. Thus it may be understood whereby the cam actuating plunger 314 is only moved to the extended position thereof at such times when the control switch 298 has been switched to the "on" position thereof by the passage of a cam control pin 274 therebelow.

The control switch 300 (FIGS. 18 and 19) is electrically connected to the solenoid 312 of the solenoid operated, cam actuating assembly 80 (FIG. 11) in such manner that the said solenoid is only energized when the said control switch is switched to the "on" position thereof by the depression of the switch actuating arm 308 by a cam control pin 276. Thus, it may be understood whereby the cam actuating plunger 316 is only moved to the extended position thereof at such times when the control switch 300 has been switched to the "on" position thereof by the passage of a cam control pin 276 therebelow.

Figure 9:
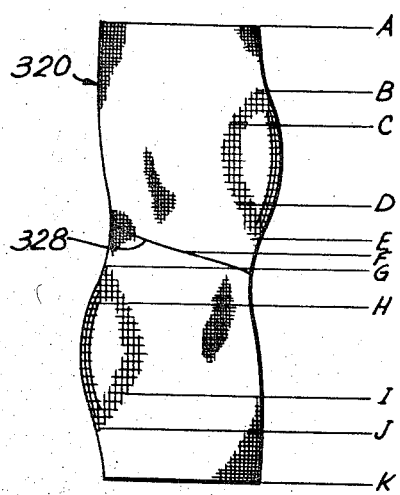
FIG. 9 is a side view of a girdle blank constructed in accordance with the teachings of my invention.

Prior to the commencement of operation, as for example in the manufacture of a plurality of girdles 30 as depicted in FIG. 1, from a tube 66 of girdle blanks, 320 as depicted in FIG. 9, the respective movable sinker burr assemblies 54, 56, 58 and 60 (FIG. 11) are adjusted, if necessary, relative to the periphery of the rotatable, cylinder assembly plate 65 to insure that the respective sinker burrs 62 are positioned in the "normal" position thereof relative to the circular array of needles 52 with the said cam follower rollers in firm contact with the said plate periphery. In addition, the respective star wheels 230 of the cylinder cam assemblies 72 are adjusted, if necessary to insure that the respective buffing cams 74 are initially in the extended positions thereof and as follows, that the respective shaping cams 76 are initially in the fully retracted positions thereof. Thus, it is insured that a smooth, substantially circular periphery is initially presented to the cam follower rollers 64 by the rotatable, cylinder assembly plate to result in the manufacture of a fabric having the normal fabric construction of FIG. 4 at the start of operation of the knitting machine.

In addition, the pattern chain 262 is adjusted, if necessary, relative to the chain drive wheel 258 and the actuator arm 268 of control switch 266 so that what may be termed the "initial" point 322 (FIG. 20) on the said chain is initially located directly below the actuator arm 268 of the control switch 266. The cam control cylinder 270 is similarly adjusted, if necessary, to insure that the first cam control pin 274, as indicated by 274a in FIG. 21, is just approaching the actuator arm 306 of the control switch 298 whereby the said switch will be momentarily switched to the "on" position thereof attendant the first advancement of the cam control cylinder 270.

Operation of the knitting machine is then commenced by the activation of the non-illustrated, conventional drive means which function to rotate the cylinder assembly plate 65 and fabric take-up roll 53, and to intermittently rotate the chain drive cylinder 258, through drive shaft 280, pawl 283 and racking gear 261, to drive the pattern chain 262 through the control assembly 82 in the manner described in detail hereinabove. Thus, the manufacture of the tube of fabric 66 which is to form the body portion 40 of a girdle 30 is commenced. For convenience of description, this stage in the manufacture of a girdle is indicated by the reference line A in FIGS. 1 and 9.

Operation of the knitting machine then proceeds in a normal manner until the first chain pin 264, as indicated by 264a in FIG. 20, of the first chain pin group on the pattern chain 262 contacts and depresses the actuator arm 268 of control switch 266, thereby momentarily energizing the shield actuating solenoid 294 and moving the shield 288 to the "inoperative" position thereof to enable pawl 282 to advance the cam control cylinder 270 one tooth position of the racking gear 272. As this occurs, the first cam control pin 274a (FIG. 21) on the cam control cylinder 270 will depress switch actuator 306 to momentarily switch the control switch 298 to the "on" position thereof. This will momentarily energize solenoid 310 of the solenoid operated, cam actuating assembly 78 to momentarily move cam actuating plunger 314 to the extended position thereof, whereby the star wheel 230 of the cylinder cam assembly 72 will strike the now extended plunger as the said star wheel is next rotated therepast and will be rotated one quarter turn about its axis. Immediately after this occurs, the solenoid 310 will be deenergized, through the return of the control switch 298 to the "off" position thereof, to return the cam actuating plunger 314 to the retracted position thereof to prevent the striking thereof by the star wheel 230 of the cylinder cam assembly 72.

The one quarter turn of the star wheel 230 will commence the intermittent movement of the buffing cam 74 of the cylinder cam assembly 72 from the extended position thereof toward the retracted position thereof, and the intermittent movement of the respective shaping cams 76 of the cylinder cam assembly 72 from the retracted positions thereof toward the extended positions thereof for the reasons described in detail hereinabove. Since the periphery of the buffing cam 74 is now moved to a position radially inward of the periphery of the rotating cylinder assembly plate 65, the cam follower rollers 64 of the respective movable sinker burr assemblies will, upon the rotation of the undercut portion 206 (FIG. 14) of the cylinder assembly plate 65 therepast, each function to momentarily move the respective sinker burr 62 associated therewith, from the normal position thereof toward the retracted position thereof to momentarily shorten the textile yarn stitch length as described in detail hereinabove to thus commence the formation of the seam piece 44. In addition, since the respective peripheries of the shaping cams 76 now extend slightly beyond the periphery of the cylinder assembly plate 65, the said shaping cams will accordingly function to momentarily push the cam follower rollers 64 away from the periphery of the said cylinder assembly plate as the now partially protruding shaping cams are rotated past the said cam follower rollers. This will result in the momentary movement of the respective moveable sinker burrs 62 associated with the said cam follower rollers toward the extended positions thereof to momentarily lengthen the textile yarn stitches and commence the formation of the "spots" or pockets 42. This stage in the manufacture of the girdle 30 is indicated by the reference line B in FIGS. 1 and 9.

Operation of the knitting machine continues in this manner with each succeeding chain pin 264 and cam control pin 274 in the respective first groups thereof functioning to intermittently move the buffing cam 74 of the cylinder cam assembly 72 toward the retracted position thereof, and to simultaneously, intermittently move the respective shaping cams 76 of the cylinder cam assembly 72 toward the extended positions thereof.

The said buffing and shaping cams will simultaneously reach the respective retracted and extended positions thereof immediately following the movement of the last chain pin 264b (FIG. 20), of the first group thereof, past the actuator arm 268 of control switch 266, and the attendant movement of the eighth cam control pin 274b (FIG. 21) past the actuator arm 306 of the control switch 298. This stage in the manufacture of a girdle 30 is indicated by the reference line C in FIGS. 1 and 9, and may be understood to represent the stage at which the respective "spots" or pockets 42, and seam piece 44, have assumed the maximum widths thereof.

Since the last chain pin 264b has now moved beyond the actuator arm 268 of the control switch 266, the buffing cam 74 and shaping cams 76 of the cylinder cam assembly 72 will remain in the respective retracted and extended positions thereof (to enable the formation of the respective maximum width portions of the pockets 42 and seam piece 44) until the first chain pin 264c of the second group thereof reaches and depresses the actuator arm 268 to cause the ninth cam control pin 274c to depress actuator arm 306 of the control switch 298 and commence the movement of the buffing cam 74 back toward the extended position thereof, and the movement of the shaping cams 76 back toward the respective retracted positions thereof. This stage in the manufacture of a girdle 30 is indicated by the reference line D in FIGS. 1 and 9.

Operation continues in this manner until the last chain pin 264d of the second group thereof has been moved past the actuator arm 268 and the last cam control pin 274d has accordingly moved past the actuator arm 306 of the control switch 298 to result in the simultaneous return of the buffing cam 74 of the cylinder cam assembly 72 to the extended position thereof and the shaping cams 76 of the cylinder cam assembly 72 to the respective retracted positions thereof. This stage in the manufacture of a girdle 36, which corresponds with the completion of the formation of the pockets 42 and seam piece 44, is indicated by reference line E in FIGS. 1 and 9 of the drawings.

Operation of the knitting machine now continues to complete the remainder of the body portion 40 of the girdle, with the buffing cam 74 and shaping cams 76, remaining in the respective extended and retracted positions thereof as the pinless portion 324 (FIG. 20) of the pattern chain 262, which is located thereon as shown between the second and third groups of chain pins 264, is driven through the control assembly by the operation of the chain drive wheel 258. This results in the completion of a first girdle 30 from the blank 320, and the commencement of the formation of a succeeding girdle 30 from the said blank. This stage in the manufacture of the girdles is indicated by the reference line F in FIG. 1, and is generally indicated by the same reference line in FIG. 9. The stage in the operation of the knitting machine wherein the same passes from the completion of a first girdle 30, to the formation of a second girdle 30, coincides with the movement of the midpoint of the pinless portion 324 of the pattern chain 262 into position adjacent the actuator arm 268 of the control switch 266.

Thus, the formation of the body portion 40 of a second girdle is commenced and continues until the first chain pin 264e in the third group thereof reaches and depresses switch actuator arm 268 of control switch 266 to result in the renewed advancement of the cam control cylinder 270. This in turn results in the first cam control pin 276e (FIG. 21) of the group thereof reaching and depressing actuator arm 308 of control switch 300 to momentarily switch the said control switch to the "on" position thereof, whereby the solenoid 312 (FIG. 11) of the solenoid operated, cam actuating assembly 80 is momentarily energized to move the cam actuating plunger 316 to the extended position thereof. Thus, the star wheel 230 of the cylinder cam assembly 72 will strike the now extended cam actuating plunger 230 as the said star wheel is next rotated therepast attendant the rotation of the cylinder assembly plate 65 from which the said star wheel is carried. This will result in a one quarter turn of the said star wheel about its own axis. Immediately after this occurs, the solenoid 312 will be deenergized, through the return of the control switch 300 to the "off" position thereof, to return the cam actuating plunger 316 to the retracted position thereof to prevent the striking thereof by the star wheel 230 of the cylinder cam assembly 72.

The one quarter turn of the star wheel 230 will commence the intermittent movement of the buffing cam 74 of the cylinder cam assembly 72 from the extended position thereof toward the retracted position thereof, and will commence the intermittent movement of the respective shaping cams 76 of the cylinder cam assembly 72 from the retracted positions thereof toward the extended positions thereof. Thus, the formation of the respective pockets 42 and seam piece 44 in a second girdle will be commenced, with this stage in the operation of the knitting machine being indicated by the reference line G in FIG. 9.

Operation of the knitting machine continues with the buffing cam 74 and shaping cams 76 of the cylinder cam assembly 72 being moved between the respective extended and retracted positions thereof by the operation of the third and fourth groups of chain pins 264, the control switch 266, the group of cam control pins 276, the control switch 300, and the solenoid operated cam actuating assembly 312, in the same manner, as described hereinabove, that the first and second groups of the said chain pins, the control switch 266, the group of cam control pins 274, the control switch 298, and the solenoid operated, cam actuating assembly 310, operated to move the buffing cam 74 and shaping cams 76 between the respective extended and retracted positions thereof.

Thus, the buffing cam 74 and shaping cams 76 of the cylinder cam assembly 72 reach the respective retracted and extended positions thereof just after the last chain pin 264f in the third group thereof reaches and depresses actuator arm 268 of switch 266, and the eighth cam control pin 276f in the group thereof accordingly reaches and depresses actuator arm 308 of the control switch 300. This stage is indicated by the reference line H in FIG. 9.

The buffing cam 74 and shaping cams 76 of the cylinder cam assembly 72 commence their intermittent return to the respective extended and retracted positions thereof just after the first chain pin 264g reaches and depresses actuator arm 268 of control switch 266, and the ninth cam control pin 276g in the group thereof accordingly reaches and depresses actuator arm 308 of the control switch 300. This stage is indicated by the reference line I in FIG. 9.

The buffing cam 74 and shaping cams 76 of the cylinder cam assembly 72 are returned to the respective extended and retracted positions thereof just after the last chain pin 264h in the fourth group thereof reaches and depresses actuator arm 268 of cotrol switch 266, and the sixteenth cam control pin 276h in the group thereof accordingly reaches and depresses actuator arm 308 of control switch 300. This stage is indicated by the referenece line J in FIG. 9.

The manufacture of the second girdle 30 in the blank 320 is completed, as indicated by the reference line K in FIG. 9, just as the initial point 322 (FIG. 20) of the pattern chain 262 is returned to position below the actuator arm 268 of the control switch 266 leaving the cam control cylinder 270 positioned so that the next advancement thereof will again cause cam control pin 274a to reach and depress actuator arm 306 of control switch 298 to once again operate the cylinder cam assembly 70 and commence the formation of the pockets 42 and seam piece 44 in a third girdle.

The operation of the knitting machine is, of course, continuous, with each complete drive of the pattern chain through the control assembly, and attendant complete driven revolution of the cam control cylinder 270 functioning to form a girdle blank 320. Thus the tube of fabric 66 knit by the operation of the knitting machine will constitute succeeding girdle blanks 320, each of which in turn constitutes two girdles 30.

After the operation of the knitting machine has been stopped, as for example when the capacity of the take-up roll 53 is reached, the tube of fabric 66 is cut along each of the reference lines A and K, and along each of the reference lines 328 (FIG. 9), whereby the girdles 30 are separated for finishing in conventional manner.

Thus my invention makes possible the rapid, convenient, and relatively inexpensive manufacture of girdles which include integral, selectively located pockets or convex portions 42, and an integral seam piece or concave portion 44, all of predetermined configuration and extent, on somewhat modified, circular spring needle knitting machines without requiring the addition of courses to the girdle fabric construction.

The method and apparatus of my invention are equally applicable to the manufacture of articles of clothing other than girdles. For example, in the manufacture of one-piece women's bathing suits, one of the cylinder cam assemblies 72 could be operated to form integral, form-fitting pockets or cups, of predetermined configuration, size, and location, for the breasts of wearer, and to form an integral, seam piece therebetween, also of predetermined configuration, size, and location, while the other cylinder cam assembly could be utilized to form integral, form-fitting pockets in the nature of the pockets 42, again of predetermined configuration, size, and location, for the buttock cheeks of the wearer, and to form an integral seam piece in the nature of a seam piece 44 therebetween.

Since the configuration, size, and location of the respective pockets and seam pieces are determined by the number and location of the chain pins 264 on the pattern chain 262, the number and location of the cam control pins 274 and 276 on the cam control cylinder 270, and the sizes and configurations of the respective buffing and shaping cams, it may be clearly understood whereby a wide variety of the former are made possible through appropriate variation in one or more of the latter.

While I have shown and described a preferred embodiment of the invention, it will be understood that the invention may be embodied otherwise than as herein specifically illustrated and described, and that certain changes in the form and arrangement of parts and in the specific manner of practicing the invention may be made without departing from the underlying ideas or principles of the invention within the scope of the appended claims.

What is claimed is:

1. In knitting machine apparatus of the circular spring needle type, including a stationary base portion and a rotatable cylinder assembly with a generally circular array of needles positioned thereon, for the formation of integral pockets and seam pieces of predetermined configuration and size at predetermined locations in knit fabrics being manufactured in generally tubular form by the operation of the said apparatus and comprising interwoven courses, each of which in turn includes a stitch of textile yarn, the improvement comprising, a plurality of sinker burr means which are supported from said base portion and are movable between extended, normal and retracted positions thereof relative to the said needles to control the stitch length of the textile yarn in each of the said courses, means carried by and rotatable with said rotatable cylinder assembly for moving said sinker burr means between said extended, normal and retracted positions thereof, actuating means supported from said base portion for actuating said sinker burr means moving means, and control means supported from said base portion for controlling the operation of said actuating means to move said sinker burr means from the said normal positions thereof toward and to the said extended positions thereof at predetermined points and for predetermined periods of time during the operation of the said apparatus to increase the stitch length of the textile yarn in the said courses to form the said integral pockets, and to move said sinker burr means from the said normal positions thereof toward and to the said retracted positions thereof at predetermined points and for predetermined periods of time during the operation of the said apparatus to decrease the stitch length of the textile yarn in the said courses to form the said integral seam pieces, each of said sinker burr means comprising support means extending from said stationary base portion, spindle means slidably supported from said support means and movable between extended, normal and retracted positions thereof relative to said needles, a sinker burr rotatably supported by said spindle means adjacent said needles, and draw bar means cooperatively associated with said spindle means for moving the latter, and said sinker burr, between said extended normal and retracted positions thereof, said sinker burr means moving means comprising a cylinder cam assembly including a shaping cam and a buffing cam, said cams being movable between extended and retracted positions thereof relative to said rotatable cylinder assembly by said actuating means, said shaping cam being operative, when in the extended position thereof, to cooperate with said draw bar means and move said sinker burrs to the extended positions thereof as the said shaping cam is rotated past the sinker burr means attendant the rotation of said rotatable cylinder assembly, and said buffing cam being operative, when in the retracted position thereof, to cooperate with said draw bar means and move said sinker burrs to the retracted positions thereof as the said buffing cam is rotated past the sinker burr means attendant the rotation of said rotatable cylinder assembly.

2. In knitting machine apparatus of the circular spring needle type including a stationary base portion and a rotatable cylinder assembly with a generally circular array of needles positioned thereon, for the formation of integral pockets and seam pieces of predetermined configuration and size at predetermined locations in knit fabrics being manufactured in generally tubular form by the operation of the said apparatus and comprising interwoven courses, each of which in turn includes a stitch of textile yarn, the improvement comprising, a plurality of sinker burr means which are supported from said base portion and are movable between extended, normal and retracted positions thereof relative to the said needles to control the stitch length of the textile yarn in each of the said courses, means carried by and rotatable with said rotatable cylinder assembly for moving said sinker burr means between said extended, normal and retracted positions thereof, actuating means supported from said base portion for actuating said sinker burr means moving means, and control means supported from said base portion for controlling the operation of said actuating means to move said sinker burr means from the said normal positions thereof toward and to the said extended positions thereof at predetermined points and for predetermined periods of time during the operation of the said apparatus to increase the stitch length of the textile yarn in the said courses to form the said integral pockets, and to move said sinker burr means from the said normal positions thereof toward and to the said retracted positions thereof at predetermined points and for predetermined periods of time during the operation of the said apparatus to decrease the stitch length of the textile yarn in the said courses to form the said integral seam pieces, said sinker burr means moving means comprising a cylinder cam assembly including a shaping cam and a buffing cam, said cams being movable between extended and retracted positions thereof relative to said rotatable cylinder assembly by said actuating means, said shaping cam being operative, when in the extended position thereof, to move said sinker burr means to the extended positions thereof as the said shaping cam is rotated past the sinker burr means attendant the rotation of said rotatable cylinder assembly, and said buffing cam being operative, when in the retracted position thereof, to move said sinker burr means to the retracted positions thereof as the said buffing cam is rotated past said sinker burr means attendant the rotation of said rotatable cylinder assembly plate, said actuator means comprising electrically actuated plunger means which are movable between extended and retracted positions thereof relative to said cylinder cam assembly, said plunger means being operative, only when in said extended position thereof, to cooperate with and move said buffing and shaping cams as the latter are rotated therepast attendant the rotation of said rotatable cylinder assembly.

3. In apparatus as in claim 2 wherein, said control means comprise a rotatable cam control cylinder with pin means extending therefrom, means to intermittently rotate said cam control cylinder, and switch means cooperatively associated with said cam control pins and actuatable thereby upon the rotation of said cam control cylinder, said switch means being operable to control the movement of said electrically actuated plunger means between the said extended and retracted positions thereof to in turn control the movement of said shaping and buffing cams between the said extended and retracted positions thereof.

References Cited

UNITED STATES PATENTS

| | | | |
|---|---|---|---|
| 365,244 | 6/1887 | Covell | 66—105 |
| 414,105 | 10/1889 | Covell | 66—105 |
| 536,744 | 4/1895 | Tiffany | 66—105X |
| 915,627 | 3/1909 | Schuyler | 66—105X |
| 917,989 | 4/1909 | Barratt | 66—105X |
| 1,003,085 | 9/1911 | Barratt | 66—105X |
| 3,243,975 | 4/1966 | Lawson et al. | 66—79 |
| 3,301,013 | 1/1967 | Moyer | 66—54 |

FOREIGN PATENTS

| | | | |
|---|---|---|---|
| 5,535 | 1906 | Great Britain | 66—105 |
| 9,103 | 1907 | Great Britain | 66—105 |
| 19,408 | 1891 | Great Britain | 66—105 |

W. C. REYNOLDS, Primary Examiner